(12) United States Patent
Kasahara

(10) Patent No.: US 10,914,580 B2
(45) Date of Patent: Feb. 9, 2021

(54) MEASUREMENT SYSTEM, MEASUREMENT PROGRAM, AND CONTROL METHOD

(71) Applicant: MITUTOYO CORPORATION, Kanagawa (JP)

(72) Inventor: Kohju Kasahara, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 316 days.

(21) Appl. No.: 15/923,615

(22) Filed: Mar. 16, 2018

(65) Prior Publication Data

US 2018/0274913 A1    Sep. 27, 2018

(30) Foreign Application Priority Data

Mar. 21, 2017   (JP) ................... 2017-054299

(51) Int. Cl.
   *G01B 21/04*    (2006.01)
   *G01B 5/008*    (2006.01)

(52) U.S. Cl.
   CPC ............ *G01B 21/045* (2013.01); *G01B 5/008* (2013.01)

(58) Field of Classification Search
   CPC .............................. G01B 21/045; G01B 5/008
   See application file for complete search history.

(56) References Cited

U.S. PATENT DOCUMENTS

| 9,429,928 | B2 | 8/2016 | Michiwaki | |
| 2002/0123858 | A1* | 9/2002 | Ogura | G01B 21/045 702/152 |
| 2005/0076522 | A1* | 4/2005 | Matsuki | G01B 5/28 33/554 |
| 2013/0345854 | A1* | 12/2013 | Michiwaki | G05B 19/18 700/195 |

FOREIGN PATENT DOCUMENTS

JP    2014-002654 A    1/2014

* cited by examiner

*Primary Examiner* — Mischita L Henson
(74) *Attorney, Agent, or Firm* — Greenblum & Bernstein, P.L.C.

(57) ABSTRACT

A measurement system includes a measuring instrument having coordinate measurement capabilities, and a control device generating a command for controlling operation of the measuring instrument. The measuring instrument includes an NC controller executing an operation that is based on a command stored in a command storage that can be browsed by the measuring instrument, and writing a result of the executed operation to the command storage. The control device includes an NC driver writing the command to the command storage, and writing information contingent on the command and on the result of the operation by the measuring instrument to the command storage.

12 Claims, 5 Drawing Sheets

| | | Command storage region | | | Write → Read |
|---|---|---|---|---|---|
| | | 1st region | 2nd region | 3rd region | |
| Operation details | | #999 | | ... | Measurement device → Control device |
| Operation flag | | #903 | | ... | Control device → Measurement device |
| Displacement coordinate values | X | #900 | #953 | ... | Control device → Measurement device |
| | Y | #901 | #951 | ... | |
| | Z | #902 | #952 | ... | |
| Next command storage address | | #914 | #964 | ... | |
| Measured value | X | #904 | #954 | ... | Measurement device → Control device |
| | Y | #905 | #955 | ... | |
| | Z | #906 | #956 | ... | |
| Current position | X | #907 | #957 | ... | |
| | Y | #908 | #958 | ... | |
| | Z | #909 | #959 | ... | |
| | A | #910 | #960 | ... | |
| | C | #911 | #961 | ... | |
| Measurement speed | | #912 | #962 | ... | Control device → Measurement device |
| Displacement speed | | #913 | #963 | ... | |
| Coordinate values of displacement start point | X | #915 | #965 | ... | Measurement device → Control device |
| | Y | #916 | #966 | ... | |
| | Z | #917 | #967 | ... | |

(b)

| Value | Operation | Write → Read |
|---|---|---|
| 1 | Positioning | Control device → Measurement device |
| 2 | Measurement | |
| 3 | A/C axis rotation | |
| 4 | B axis rotation | |
| 5 | Operation end | Measurement device → Control device |
| 6 | Error message | |
| 7 | NC program end | Control device → Measurement device |
| 8 | Error message | Measurement device |

Fig. 5

MEASUREMENT SYSTEM, MEASUREMENT PROGRAM, AND CONTROL METHOD

CROSS-REFERENCE TO RELATED APPLICATIONS

The present application claims priority under 35 U.S.C. § 119 of Japanese Application No. 2017-054299, filed on Mar. 21, 2017, the disclosure of which is expressly incorporated by reference herein in its entirety.

BACKGROUND OF THE INVENTION

1. Field of the Invention

The present invention relates to a measurement system, a measurement program, and a control method.

2. Description of Related Art

Conventionally, a measurement system is known which causes a measurement device to perform a coordinate measurement operation in accordance with a command that controls a coordinate measuring device. For example, Japanese Patent Laid-open Publication No. 2014-002654 describes causing an NC machine tool to perform a coordinate measurement operation by mounting a coordinate measurement probe to the NC machine tool; a terminal device converting a command for controlling a coordinate measuring device into a command causing the NC machine tool to operate; and causing, via an NC controller, the NC machine tool to perform an operation corresponding to the converted command.

However, an error may occur during execution of the coordinate measurement operation. In NC machine tools, checking for the occurrence of an error in a coordinate measurement operation is conducted on the NC machine tool side, and when an error occurs, the terminal device is notified. However, when conducting a coordinate measurement using an all-purpose device that mimics an NC machine tool, checking for the occurrence of an error must be conducted on the terminal device side. In such a case, the terminal device and the NC controller are operating asynchronously, and therefore, the NC machine tool may continue to operate even when an error is detected on the terminal device side and the NC machine tool must be made to carry out an error recovery operation.

SUMMARY OF THE INVENTION

The present invention has been conceived in light of the circumstances above, and provides a measurement system, measurement program, and control method capable of performing an appropriate process when an error occurs.

A measurement system according to an aspect of the present invention includes a measurement device having coordinate measurement capabilities; and a control device that generates a command for controlling operation of the measurement device. The measurement device includes an operation executor executing an operation that is based on a command stored in a command storage region that can be browsed by the measurement device, and writing a result of the executed operation to the command storage region. The control device includes an operation controller writing the command to the command storage region, and writing information contingent on the command and on the result of the operation to the command storage region.

In a case where a measured value of a coordinate measurement included in the result of the operation is not within a range predicted based on the command, the operation controller may also write error information indicating that an error has occurred to the command storage region. The command storage region may also include a region storing a plurality of the commands, and the operation controller may write a plurality of the commands to the command storage region.

The operation executor may also communicate to the control device details of the operation being performed by the measurement device. The operation executor may also communicate to the control device the details of the operation by writing information to the command storage region, the information identifying the details of the operation being performed by the measurement device. The operation controller may also determine what operation to cause the measurement device to perform next based on the communicated details of the operation, and may write the command corresponding to that operation to the command storage region.

When determining what operation to cause the measurement device to perform next, the operation controller may also erase from the command storage region a command for an operation to be performed later than the operation being performed, and may also write the command corresponding to the operation to be performed next to the command storage region.

A measurement program according to another aspect of the present invention causes a computer that generates a command for controlling a measurement device having coordinate measurement capabilities and that controls the measurement device based on that command, to act as an operation controller writing a command for causing the measurement device to perform an operation to a command storage region included in a memory that can be browsed by the measurement device, and writing to the command storage region information that is contingent on the command and on a result of the operation written to the command storage region by the measurement device.

A control method according to another aspect of the present invention is a control method in which a control device that generates a command for controlling a measurement device having coordinate measurement capabilities controls the measurement device, the method including a step of writing a command for causing the measurement device to perform an operation to a command storage region included in a memory that can be browsed by the measurement device; and a step of writing to the command storage region information that is contingent on the command and on a result of the operation that is written to the command storage region by the measurement device.

The present invention has the benefit of enabling an appropriate process to be performed when an error occurs.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Configuration of Measurement System S

Figure 1:
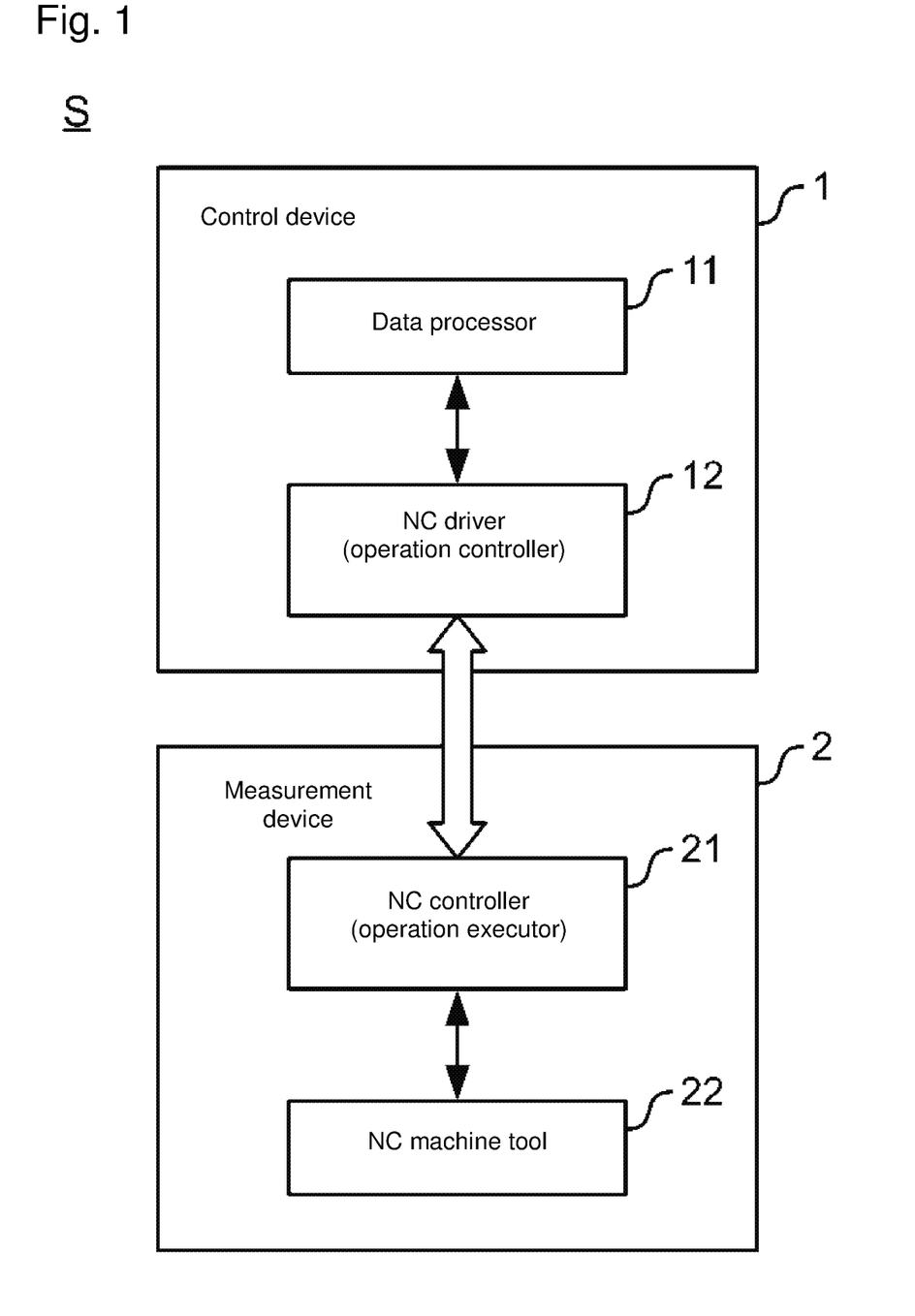
FIG. 1 illustrates a configuration of a measurement system according to an embodiment of the present invention.

FIG. 1 illustrates a configuration of a measurement system S according to an embodiment of the present invention. The measurement system S includes a control device (controller) 1 and a measurement device (measuring instrument) 2. The control device 1 is a device capable of generating a command (hereafter, "machine tool command") that is based on a command controlling a coordinate measuring device (hereafter, "coordinate measurement command"). The measurement device 2 is an NC machine tool. The measurement system S is a system that causes the measurement device 2 to perform a coordinate measurement operation in accordance with the machine tool command generated by the control device 1. The machine tool command may be configured by, for example, a common variable that causes the measurement device 2 to operate.

The control device 1 is a computer provided with a controller such as a CPU, and memory such as a hard disk or memory device. The control device 1 includes a data processor 11 and an NC driver 12 (operation controller). The control device 1 communicates with the measurement device 2 using a communication method such as RS-232C or TCP/IP. The control device 1 may also be configured to communicate with the measurement device 2 using an API (Application Programming Interface) or class module provided by an individual manufacturer for the purposes of communication. The control device 1 operates as the data processor 11 and the NC driver 12 by executing a program stored in the memory.

A user provides the data processor 11 with details of a measurement to be performed by the measurement device 2. The data processor 11 may, for example, cause a screen to display on a display panel of the control device 1, the screen accepting the input of settings related to details of the operation to be performed by the measurement device 2, and may acquire settings information input by the user. The data processor 11 generates a coordinate measurement command based on the acquired settings information and communicates the generated coordinate measurement command to the NC driver 12. The data processor 11 also displays measurement results (acquired from the measurement device 2 via the NC driver 12) on the display panel of the control device 1.

The NC driver 12 converts the coordinate measurement command to a machine tool command that controls the measurement device 2, and transmits the converted command to the measurement device 2. The NC driver 12 also acquires the results measured by the measurement device 2 and communicates the acquired measurement results to the data processor 11. Because the NC driver 12 is provided to the control device 1, which is used to control the coordinate measuring device, the user can use the control device 1 to control the measurement device 2 and can perform a coordinate measurement that uses the measurement device 2.

The NC driver 12 generates a machine tool command based on a coordinate measurement command, the machine tool command causing various operations of the measurement device 2 to be performed. The NC driver 12 also stores the generated machine tool command in a command storage region (command storage) within a memory which can be browsed by the measurement device 2. The NC driver 12 may, for example, transmit to the measurement device 2 an instruction that the machine tool command be stored in a command storage region. The NC driver 12 may also, by way of the measurement device 2, change the value of a variable, the variable having an assigned variable number that corresponds to a region of the command storage region. The NC driver 12 may thereby store the machine tool command in the command storage region. Before the measurement device 2 completes an operation corresponding to one command, the NC driver 12 stores the next command in a command storage region. Thereby, the measurement system S can shorten the amount of time between the measurement device 2 completing the operation that corresponds to one command and performing the operation that corresponds to the next command, and measurement operations can be sped up in the measurement device 2.

The NC driver 12 acquires the results of the measurement by the measurement device 2, converts the acquired measurement results into control device-usable data, and inputs the converted control device data to the data processor 11. For example, in response to receiving a notification from the measurement device 2 indicating that the measurement corresponding to one command is complete, the NC driver 12 may acquire the measurement results, which are stored in a portion of a region where the command executed by the measurement device 2 is stored.

The measurement device 2 includes an NC controller 21 (operation executor) and an NC machine tool 22. The NC controller 21 is a computer provided with a controller such as a CPU, a memory such as a hard disk or memory device, a drive control circuit causing the NC machine tool 22 to operate, various registers, and a loop counter. The NC controller 21 controls operations of the NC machine tool 22.

An NC program executed by the CPU is stored in the memory of the NC controller 21. The CPU of the NC controller 21 performs drive control of the NC machine tool 22 by executing the NC program. The NC controller 21 may, for example, communicate with the NC driver 12 via an API and receive various commands from the NC driver 12, whereby the NC controller 21 acquires the machine tool command from the NC driver 12, communicates the measurement results to the NC driver 12, and the like. When the NC controller 21 has a configuration similar to that of a generic front-end computer, the NC program may include a program run on the control device 1 and at least a portion of a program for the NC driver 12.

A probe for coordinate measurement is mounted to the NC machine tool 22, and the NC machine tool 22 performs coordinate measurement of a work piece positioned thereon in accordance with control by the NC controller 21. An example of the measurement results of the coordinate measurement may include the three-dimensional coordinates of the probe, which the NC controller 21 may record in a memory which can be browsed by the NC driver 12. Thereby, the control device 1 can acquire the measurement results stored in the memory.

Summary of Operations of Measurement System S

Figure 2:
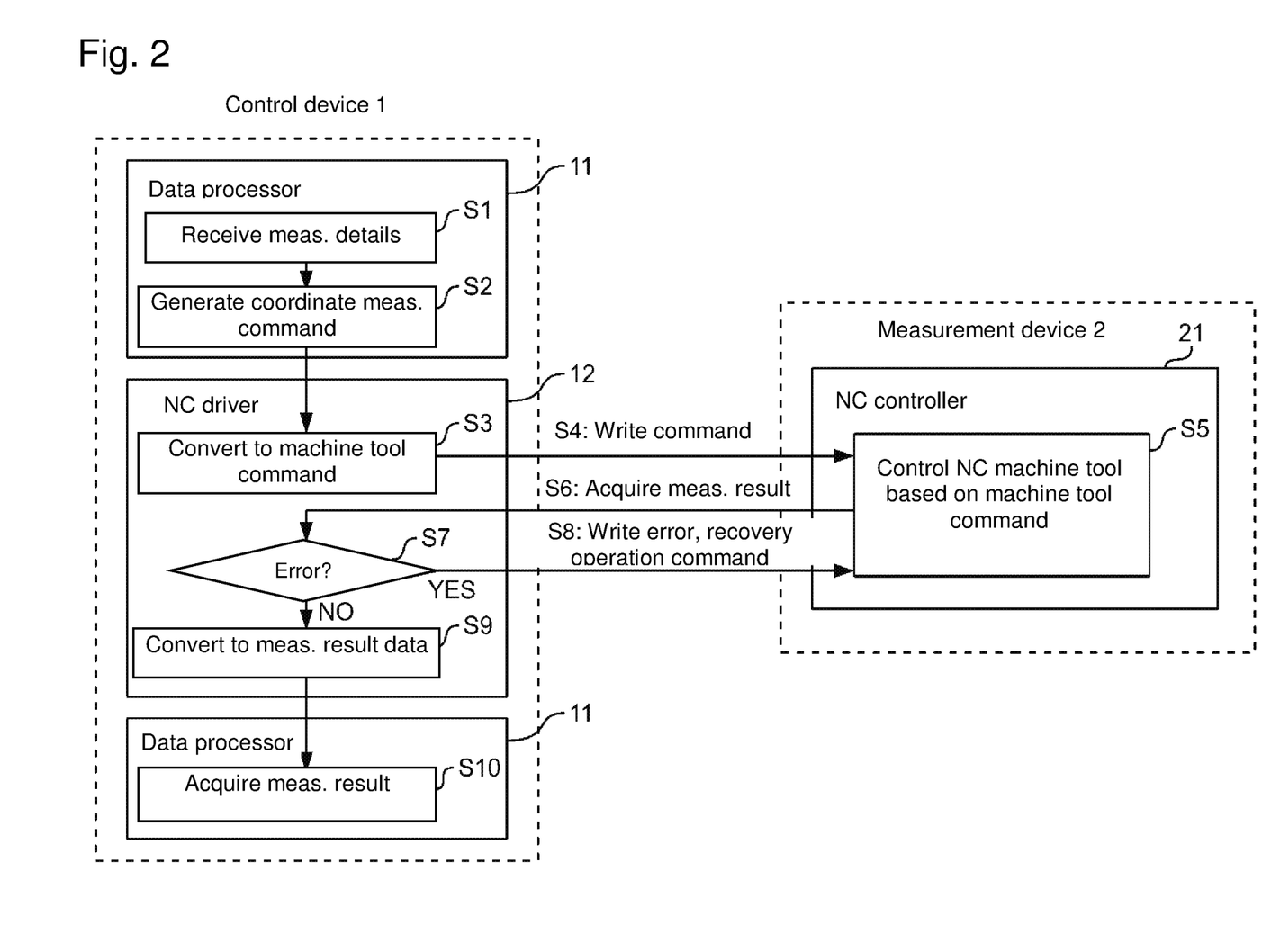
FIG. 2 provides a summary of operations of the measurement system according to the embodiment.

FIG. 2 provides a summary of operations of the measurement system S according to the present embodiment. First, the data processor 11 receives details from the user for a measurement to be performed by the NC machine tool 22 (S1). The data processor 11 generates the coordinate measurement command based on the received measurement details (S2).

Next, the NC driver 12 analyzes the coordinate measurement command and converts the command to a machine tool command that can be executed by the NC machine tool 22 of the measurement device 2 (S3). For example, the NC driver 12 may split the operation corresponding to the coordinate measurement command into one or more operations that the NC machine tool 22 is capable of performing (for example, positioning, measuring, A/C axis rotation, B axis rotation, and the like), and may generate at least one machine tool command corresponding to each of the one or more operations.

Next, the NC driver 12 writes the at least one machine tool command generated in S3 to any of a plurality of command storage regions in the memory (for example, a memory provided to the NC controller 21) that can be browsed by the measurement device 2 (S4). In this example, the memory provided to the NC controller 21 includes a number of command storage regions that is determined based on the amount of time required for the NC controller 21 to execute an operation based on a command, and the amount of time required for the NC driver 12 to write a command. For example, when the amount of time required for the NC driver 12 to write a command to a command storage region is a maximum of 200 ms and the amount of time required for the NC controller 21 to execute an operation is an average of 10 ms, the memory preferably includes at least twenty command storage regions. With such a configuration, the control device 1 can increase the potential that operations are performed without delay even when there is a delay in the writing of a command.

Specifically, the NC driver 12 writes a plurality of machine tool commands to the command storage regions. For example, the NC driver 12 writes a first command, which is a machine tool command causing the measurement device 2 to perform a first operation, to a first region within the command storage region and, before the measurement device 2 completes the first operation, the NC driver 12 writes a second command, which is a machine tool command causing the measurement device 2 to perform a second operation that is to be performed next after the first operation, to a second region within the command storage region.

The NC controller 21 runs the NC program and causes the NC machine tool 22 to perform operations based on the machine tool commands written to the command storage regions, thereby controlling the operations of the NC machine tool 22 (S5). The NC controller 21 writes information to a command storage region, the information identifying details of the operation the measurement device 2 is in the process of performing, and thereby communicates to the control device 1 the details of the operation the measurement device 2 is in the process of performing. With such a configuration, the NC driver 12 can ascertain the operation the measurement device 2 is in the process of performing.

When the in-progress operation is completed, the NC controller 21 writes operation completion information indicating that the operation is complete to the command storage region provided to the memory of the NC controller 21. Thereby, the NC driver 12 is notified that the operation is complete. Also, when the operation of the NC machine tool 22 is a measurement operation, the NC controller 21 writes measurement result information indicating the measurement results to the command storage region provided to the memory of the NC controller 21.

For example, the NC controller 21 causes the NC machine tool 22 to successively perform a plurality of operations using the following protocol. First, the NC controller 21 references the command storage region and causes the NC machine tool 22 to perform the first operation based on the first command. When the NC machine tool 22 completes the first operation based on the first command, the NC controller 21 writes the measurement result information corresponding to the first operation and the operation completion information indicating that the first operation is complete to the command storage region where the first command is stored, after which the NC controller 21 causes the NC machine tool 22 to perform the second operation based on the second command. When the NC machine tool 22 completes the second operation based on the second command, the NC controller 21 writes the measurement result information corresponding to the second operation and the operation completion information indicating that the second operation is complete to the command storage region where the second command is stored. Because the NC controller 21 writes the measurement result information to the command storage region after the command is executed in this way, a limited memory region can be utilized effectively.

In a case where the operation of the NC machine tool 22 is a measurement operation, when the operation completion information is written to the command storage region, the NC driver 12 acquires the measurement result information written to the command storage region (S6). The NC driver 12 writes information to the command storage region that is contingent on the machine tool command corresponding to the performed operation and on the results of the performed operation. Specifically, the NC driver 12 determines whether a measured value of the coordinate measurement included in the results of the measurement operation is within a range of predicted values, and depending on the determination outcome, the NC driver 12 determines whether an error has occurred (S7). The range of predicted values is predicted on the basis of the machine tool command that corresponds to the measurement operation performed. When the NC driver 12 determines that an error has occurred, the NC driver 12 writes, to the command storage region, error information indicating that an error has occurred in the measurement device 2 and notifies the measurement device 2 that an error has occurred (S8). Also, when the NC driver 12 determines that an error has occurred, the NC driver 12 decides what operation (recovery operation) to cause the measurement device 2 to perform next based on the details of the operation written in the command storage region, and writes the command corresponding to the operation (recovery operation command) to the command storage region. Thereby, the measurement device 2 can perform a recovery operation based on the newly written command.

Also, when the NC driver 12 determines that an error has not occurred in S7, the NC driver 12 converts the measurement result information acquired from the measurement device 2 into measurement result data that is usable by the control device 1 (S9). Next, the data processor 11 acquires the control device-usable measurement result data converted by the NC driver 12 and stores the data in a storage medium, displays the data on the display panel, or the like (S10). The data processor 11 may acquire the measurement result data at any desired point in time. The measurement result data may be acquired after measurement based on all coordinate measurement commands has ended, or the measurement result data may be acquired before all measurement has ended and measurement results may be displayed sequentially based on the acquired data.

In S4 above, when the plurality of machine tool commands to be executed by the NC controller 21 includes a machine tool command that is not written to a command storage region, the NC driver 12 acquires the measurement result information, and can then write a new machine tool command to the command storage region where the measurement result information is stored. With such a configuration, the measurement system S can share the command storage regions for both writing measurement result information and machine tool commands, and therefore the command storage regions can be used effectively.

Also, when the NC machine tool 22 of the measurement device 2 completes the first operation, a third command causing the NC machine tool 22 to perform a third operation that is to be performed after the second operation is written by the NC driver 12 to the first region of the command storage region, where the first command corresponding to the first operation was stored. Accordingly, the plurality of command storage regions can be used as a circular buffer.

Figure 3:
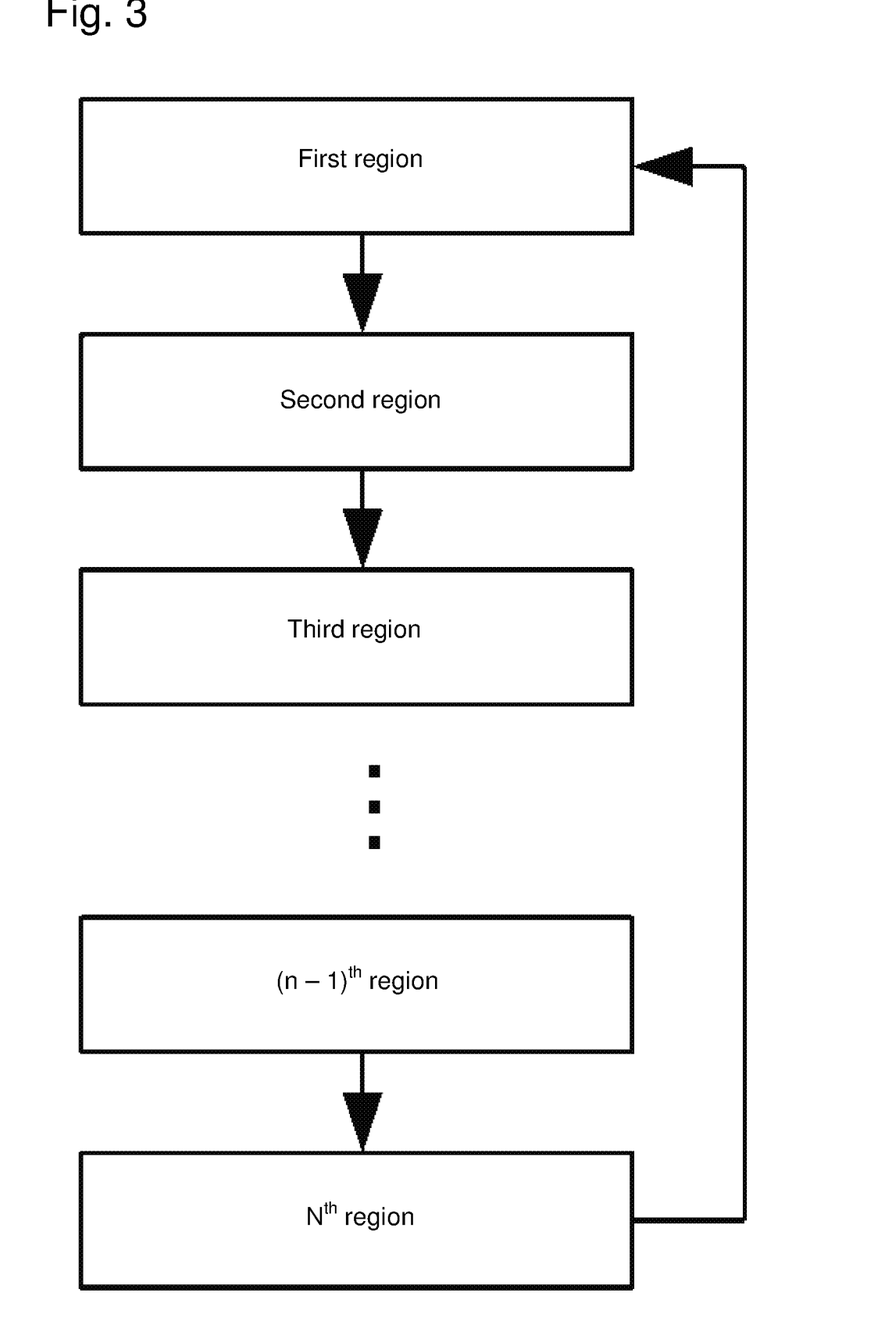
FIG. 3 illustrates an example where an NC driver uses a plurality of command storage regions as a circular buffer.

FIG. 3 illustrates an example where the NC driver 12 uses the plurality of command storage regions as a circular buffer. In the example depicted in FIG. 3, a first region, second region, third region, . . . (n−1)th region, and nth region are provided as the command storage regions. Here, n is an integer equal to or greater than 5.

First, the NC driver 12 writes the first command that causes the first operation to be performed to the first region. Similarly, the NC driver 12 writes, in order, the second command that causes the second operation to be performed to the second region, the third command that causes the third operation to be performed to a third region, . . . and an nth command that causes an nth operation to be performed to an nth region. After the operation corresponding to the first command written to the first region is performed, the NC driver 12 writes an (n+1)th command that causes an (n+1)th operation to be performed to the first region, reusing the first region. By configuring the measurement system S to be capable of repeatedly using a single command storage region as a region storing a plurality of commands in this way, even when the number of variables used in the plurality of commands exceeds the maximum number of variables that the measurement device 2 can use, the measurement system S can cause the measurement device 2 to successively execute the plurality of commands.

Variables Stored in Command Storage Region

Next, the machine tool command stored in the command storage region is described. In the present embodiment, the NC driver 12 generates, as the machine tool command, a command that contains a value for a variable. Examples of the value for the variable include a value for an operation flag corresponding to an operation the NC machine tool 22 is capable of performing, a control value used in controlling the operation (for example, coordinate values for a displacement destination of the probe, or a displacement speed of the probe), or the like. A region where the value of the variable corresponding to the machine tool command is to be stored is established in the command storage region, and the NC driver 12 writes a generated plurality of values in respective regions corresponding to each of the plurality of variables. In the description that follows, information that identifies the region corresponding to a variable is referred to as an "address." The address corresponds to, for example, the variable number assigned to a variable.

Figure 4:
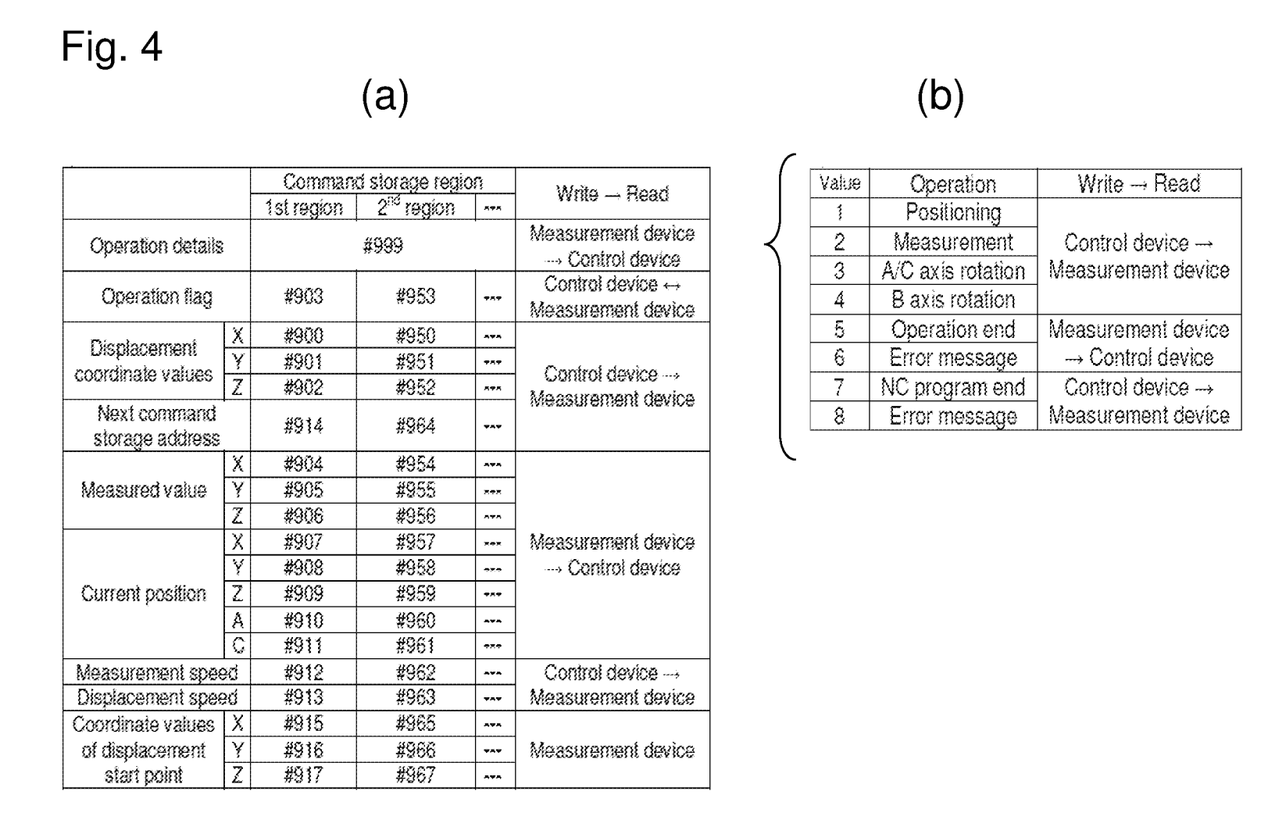
FIG. 4 illustrates an exemplary relationship between the types of variables written to the command storage regions according to the embodiment, and addresses assigned to the regions storing each variable.

FIG. 4 illustrates an exemplary relationship between the types of variables written to the command storage regions according to the present embodiment, and the addresses assigned to the regions storing each variable. As depicted in the (a) section of FIG. 4, the command storage region includes a plurality of regions for storing a plurality of machine tool commands at a single time. The (a) section of FIG. 4 depicts a first region and a second region from the plurality of regions. The first region corresponds to addresses #900 to #917, and the second region corresponds to addresses #950 to #967.

Each of the plurality of regions stores information for controlling the measurement device 2 and information indicating a status of the measurement device 2. For example, an operation flag region is provided at addresses #903 and #953, the operation flag regions storing the classifications of operations performed by the NC machine tool 22 and values for the operation flag variable that indicate the status of the NC machine tool 22.

The (b) section of FIG. 4 is a table illustrating a relationship between the values of the operation flag variable and the details of the operation. For example, an operation flag value of "1" corresponds to a process in the measurement device 2 of positioning the probe. An operation flag value of "2" corresponds to a process in the measurement device 2 of measuring the work piece. An operation flag value of "5" indicates that the measurement device 2 is in an operation ended state. An operation flag value of "8" indicates that the control device 1 has detected an error in the measurement device 2.

As depicted in section (a) of FIG. 4, the variables may also include a variable corresponding to the coordinate values of the displacement destination of the probe (for example, the variables stored in the regions with the addresses #900 to #902), a next command indicator variable indicating the address of the command storage region where the command the measurement device 2 is to perform next is stored (for example, the variable stored in the region with the address #914), an operation notification variable storing information indicating the details of the operation being performed by the measurement device 2 (for example, the variable stored in the region with the address #999), and the like.

For example, an operation notification flag region stores, as the information indicating the operation details, the address of the operation flag that corresponds to the command storage region where the command being performed by the measurement device 2 is stored. When the measurement device 2 performs an operation based on the machine tool command corresponding to the first region, for example, "903" is stored in the operation notification flag region to indicate the address where the value of the operation flag corresponding to the first region is stored. When the measurement device 2 performs an operation based on the machine tool command corresponding to the second region, for example, "953" is stored in the operation notification flag region to indicate the address where the value of the operation flag corresponding to the second region is stored. With such a configuration, the NC driver 12 can, based on the value stored in the operation notification flag region, identify the region where the command corresponding to the operation being performed by the measurement device 2 is stored, and can identify the details of the operation being performed on the basis of that command.

In the present embodiment, in cases where the NC driver 12 writes the information corresponding to the machine tool command to the command storage region, a region of the command storage region stores the next command indicator variable, and the address of a command storage region storing a machine tool command to be executed by the measurement device 2 next after the current machine tool command is written to this region. The NC driver 12 may, for example, write the smallest address out of a plurality of addresses corresponding to the command storage region storing the command to be executed next. When the operation based on one machine tool command is completed, the NC controller 21 references the address corresponding to the next command indicator variable and identifies the command next after the command for which operation is completed. With such a configuration, the NC driver 12 can notify the NC controller 21 of which command storage region, out of the plurality of command storage regions, stores the command to be executed next.

The operation flag variable, the next command indicator variable, and the variables storing command values corresponding to various operations are stored in the command storage region, and the addresses of these variables may differ depending on the specifications of the NC program prepared by the manufacturer of the NC machine tool 22. Accordingly, the NC driver 12 stores information indicating addresses that correspond to each manufacturer and, based on the specifications of the NC program of each manufacturer, the NC driver 12 may identify the address recorded in the command storage region, generate the variable for that address, and the like to write the machine tool commands to the variables. Accordingly, the NC driver 12 can write the machine tool command to comply with NC machine tools 22 made by various manufacturers.

Detailed Operations of Measurement System S

Figure 5:
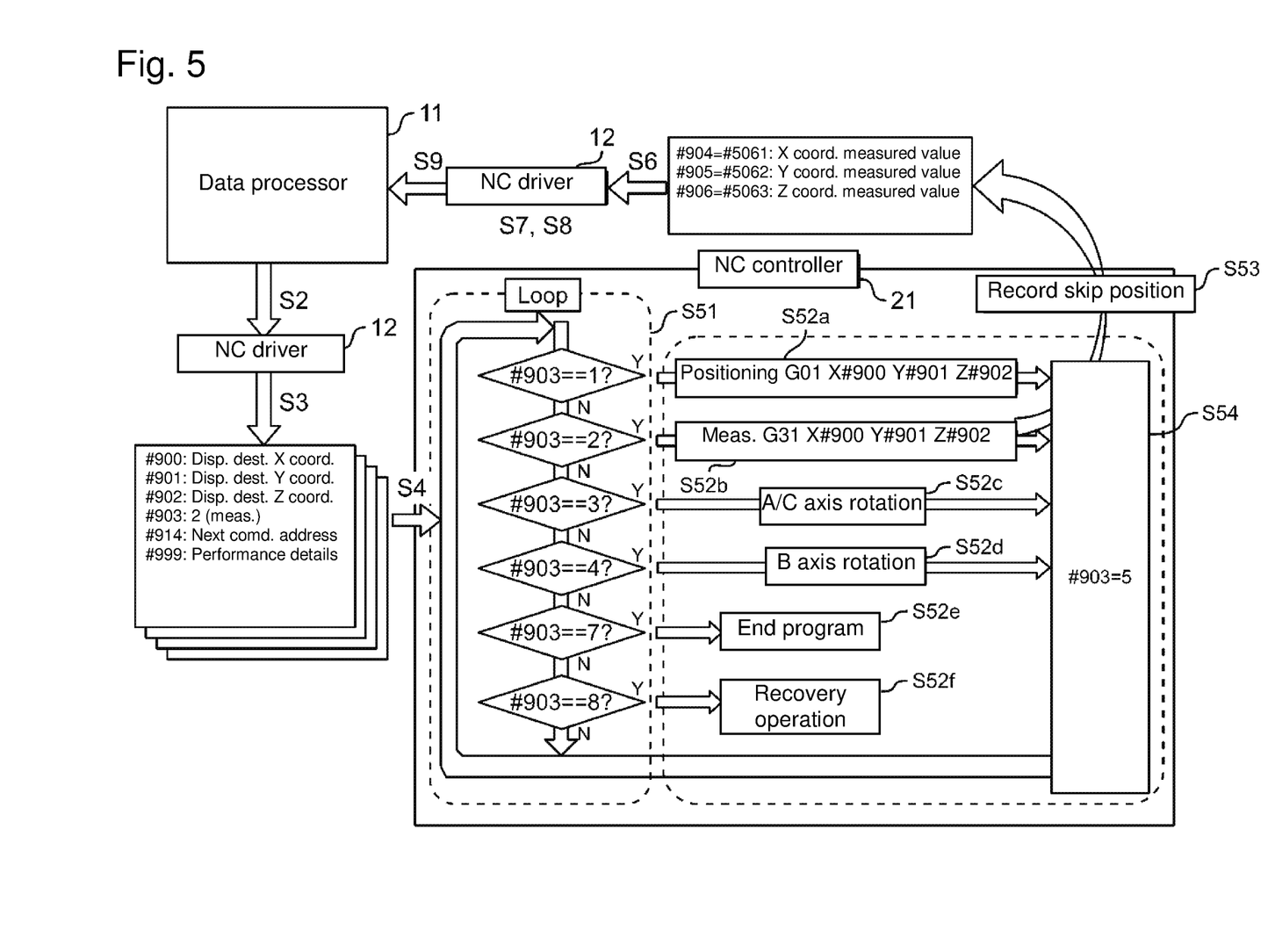
FIG. 5 illustrates an exemplary operation of the measurement system where the variables depicted in FIG. 4 are used.

Next, detailed operations of the measurement system S are described. FIG. 5 illustrates an exemplary operation of the measurement system S when using the variables depicted in FIG. 4. As described above, when the data processor 11 communicates the coordinate measurement command to the NC driver 12 (S2), the NC driver 12 analyzes the coordinate measurement command and converts the command into at least one machine tool command (S3). Next, the NC driver 12 writes, to any region of the plurality of command storage regions in the memory provided to the NC controller 21, the control value used to control the operation and the value of the operation flag corresponding to the at least one machine tool command generated in S2 (S4).

In this example, at the point when control of the measurement device 2 is initiated, information indicating that the command storage regions are in a default state, for example, is stored in all of the command storage regions as information indicating the state where commands can be written. The NC driver 12 writes machine tool commands to the command storage regions where information indicating the default state is stored.

For example, of the machine tool commands generated in S2, the NC driver 12 writes to the first region a command to be executed first by the measurement device 2. The NC driver 12 records "2" as the value of the operation flag in the region with the address #903, which corresponds to the operation flag variable, and also records the X coordinate value, Y coordinate value, and Z coordinate value of the displacement destination in the regions with the addresses #900, #901, and #902, respectively.

In addition, the NC driver 12 stores the plurality of machine tool commands in the respective command storage regions. Specifically, when n command storage regions are provided, the NC driver 12 writes, in order, the second command that causes the second operation to be performed to the second region, the third command that causes the third operation to be performed to the third region, . . . and the nth command that causes the nth operation to be performed to the nth region. The commands corresponding to the nth and subsequent operations are written after the operation corresponding to the command stored in the first region is performed.

By executing the NC program, the NC controller 21 performs a monitoring process, which monitors the value of the operation flag variable stored in the first region on a loop (S51). When the value of the operation flag variable is any of 1 to 4, 7, or 8, the NC controller 21 identifies the operation that the NC machine tool 22 is to perform, based on the information illustrated in section (b) of FIG. 4. When the value of the operation flag variable is 1, the NC controller 21 causes the NC machine tool 22 to perform a probe positioning operation (S52a). When the value of the operation flag variable is 2, the NC controller 21 causes the NC machine tool 22 to perform a work piece measurement operation (S52b). When the value of the operation flag variable is 3, the NC controller 21 causes the NC machine tool 22 to perform an A/C axis rotation operation (S52c). When the value of the operation flag variable is 4, the NC controller 21 causes the NC machine tool 22 to perform a B axis rotation operation (S52d). When the value of the operation flag variable is 7, the NC controller 21 ends the program (S52e). When the value of the operation flag variable is 8, the NC controller 21 causes the NC machine tool 22 to perform a recovery operation, described below (S52f). When the NC controller 21 identifies the operation that the NC machine tool 22 is to perform, the NC controller 21 writes the value indicating the address where the value of the operation flag variable is stored to the operation notification flag region (region with the address #999), which is shared by the plurality of command storage regions, as information indicating run details.

When the NC machine tool 22 measures the work piece, the measurement makes use of a block skip function preinstalled on the NC machine tool 22. When the probe makes contact with an object or the like while moving from a first position to a second position, the block skip function halts the movement of the probe subsequent to the point of contact and moves to the next process. When the probe makes contact with an object or the like, the NC machine tool 22 outputs a skip signal. In response to detecting the skip signal, the NC controller 21 references a status data memory region (regions with addresses #5061 to #5063) where the current position of the probe is stored, and the X coordinate value, Y coordinate value, and Z coordinate value stored in the status data memory region and indicating the probe position are recorded by the NC controller 21 to regions with the addresses #904 to #906, where the measurement results are stored (S53).

The operations of S52a, S52b, S52c, and S52d are based on the value of the operation flag variable, and when any of these operations is completed in the NC machine tool 22, the NC controller 21 writes "5" to the region with the address #903, which corresponds to the operation flag variable in the first region, "5" serving as the operation completion information indicating that the operation is completed (S54).

The value indicating the measurement results is stored in the region storing the measurement results, and in response the NC driver 12 acquires the value as the measurement result information (S6). The NC driver 12 predicts the measured value for the coordinate measurement based on the machine tool command corresponding to the measurement operation. For example, the NC driver 12 predicts the measured value for the coordinate measurement based on a probe displacement range exhibited by the measurement operation. In addition, the NC driver 12 determines whether an error has occurred by determining whether a measured value of the coordinate measurement included in the results of the measurement operation is within the range of predicted values (S7).

When the NC driver 12 determines that the measured value is not within the range of predicted values and that an error has occurred, the NC driver 12 writes, to the command storage region, error information indicating that an error has occurred in the measurement device 2 (S8). Specifically, on the basis of the information written to the operation notification flag region of the command storage region (the address where the value of the operation flag variable is stored), the NC driver 12 identifies the region where the machine tool command currently being executed is stored. Then, the NC driver 12 writes "8" (information indicating that an error has occurred) to the operation flag region corresponding to the identified region.

The NC driver 12 references the region where the next command indicator variable is stored and identifies the command storage region storing the command for the operation to be performed after the identified command. Then, the NC driver 12 erases the command stored in the identified command storage region and stores a command corresponding to the recovery operation in the command storage region as the command corresponding to the operation to be performed next. In this example, the recovery operation is, for example, a process of displacement to the probe position occupied at the point when the first operation in the coordinate measurement (or the operation that generated the error) is initiated. The NC driver 12 may, for example, write a "1" to the operation flag region in order to cause the measurement device 2 to perform positioning of the probe. Thereby, the recovery operation can be performed on the measurement device 2 and the measurement device 2 can be restored to an appropriate state, and therefore the measurement system S can restart the coordinate measurement more promptly.

While performing the operation, the NC controller 21 monitors the operation flag region of the region where the command corresponding to the operation is stored, and in response to an "8" being written to that region, the NC controller 21 stops the operation that the NC machine tool 22 is performing. Then, the NC controller 21 references the command storage region where the command for the operation to be performed next is stored and performs the recovery operation (S52f).

The NC driver 12 determines whether an error has occurred in the measurement device 2, and when the NC driver 12 determines that an error has occurred, the NC driver 12 rewrites the value of the operation flag variable to the value "8," indicating that an error has occurred. In addition, the NC driver 12 stores the command corresponding to the recovery operation in the command storage region. However, the present invention is not limited to this. For example, when the NC controller 21 rewrites the value of the operation flag variable to "7," the NC driver 12 may also respond by storing the command corresponding to the recovery operation in the command storage region where a command that is planned to be performed next is stored, and may cause the NC controller 21 to perform the recovery operation. With this configuration, the control device 1 can cause the NC controller 21 to perform the recovery operation even when an error is detected on the NC controller 21 side.

When the operation based on one machine tool command is completed, the NC controller 21 references a command storage region indicated by an address written in the region storing the next command indicator variable within the command storage region where the completed machine tool command is stored and identifies the next command. For example, based on the address stored in the region with the address #914 within the first region, the NC controller 21 identifies that the machine tool command to be executed next is stored in the second region. Then, the NC controller 21 re-executes the process of S51. When the NC controller 21 identifies the operation that the NC machine tool 22 is to perform, the NC controller 21 rewrites the information written to the operation notification flag region, which is shared by the plurality of command storage regions, such that the information gives the value that indicates the address where the value of the operation flag is stored in the second region. When the process of S51 is re-executed, the NC controller 21 monitors the operation flag variable stored in the region with the address #953 in the second region and executes the process from that point onward.

When the NC driver 12 determines that an error has not occurred in S7, the NC driver 12 converts the measurement result information acquired in S6 into measurement result data that is usable by the control device 1 (S9). A command that is temporarily stored in the memory of the control device 1 (rather than being written to a command storage region) is written, by the NC driver 12, to the command storage region where the operation completion information is stored. For example, the NC driver 12 may write the (n+1)th command, which is the command executed first out of the at least one machine tool commands temporarily stored in the memory of the control device 1, to the first region, where "5" (operation completion information) is written as the operation flag variable.

In addition, in a case where the measurement result information has been acquired, when there is no machine tool command to be written to the command storage region where the measurement result information is stored, the NC driver 12 writes information to that command storage region indicating that the status allows a machine tool command to be written to that command storage region. For example, the NC driver 12 may write information to the command storage region indicating that the command storage region is in the default state. With this configuration, when a new work piece measurement or the like is to be performed, the user can rapidly proceed to the measurement task without setting the state of the command storage regions to the default state.

In addition, when there is a command that branches based on the measurement results from the measurement device 2, the NC driver 12 may also write each of the post-branching commands in the respective plurality of command storage regions ahead of time and, after acquiring the measurement results, the NC driver 12 may write the address corresponding to the command to which the branch leads in the command storage region where the command immediately prior to the branch is stored. With this configuration, the control device 1 can cause the measurement device 2 to quickly execute a post-branching command.

In addition, when there is a command that branches based on the measurement results from the measurement device 2, after acquiring the measurement results, the NC driver 12 may also write the command to which the branch leads in a command storage region that corresponds to the address stored in the command storage region where the command immediately prior to the branch is stored. With this configuration, the control device 1 does not need to write all of the commands corresponding to the plurality of branches to command storage regions. Therefore, even when the capacity of the command storage regions is limited, the control device 1 can use a branching command.

Benefits of Present Embodiment

As described above, in the measurement system S according to the present embodiment, the NC driver 12 of the control device 1 writes a command in a command storage region, and writes information to the command storage region that is contingent on the command and on results of an operation performed by the measurement device 2 based on the command. With this configuration, when a determination is made on the NC driver 12 side that an error has occurred, based on the command and on the result of the operation, the measurement system S can communicate information to the measurement device 2 indicating that an error has occurred by writing the information to a command storage region, and can cause the measurement device 2 to perform an appropriate operation, such as the recovery operation. Accordingly, the measurement system S can perform an appropriate process when an error occurs.

The present invention is described above by way of an embodiment, but the technical scope of the present invention is not limited to that described in the embodiment above. It is clear to one skilled in the art that many modifications or improvements might be added to the embodiment above. The scope of the claims makes clear that the addition of such modifications and improvements is also included in the technical scope of the present invention.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A measurement system comprising:
a measuring instrument that measures coordinates;
a controller that generates a command for controlling an operation of the measuring instrument; and
a memory that includes a number of command storages that can be browsed by the measuring instrument, wherein:
the measuring instrument comprises an operation executor:
that executes an operation based on a command stored in a command storage of the number of command storages, and
that writes a result of the executed operation to the command storage; and
the controller includes an operation controller that writes the command to the command storage, and that writes information contingent on the command and on the result of the operation to the command storage, wherein
when a measured value of a coordinate measurement included in the result of the operation is not within a range predicted based on the command, the operation controller writes error information to the command storage indicating that an error has occurred, and
the number of command storages is based on an amount of time for the operation executor to execute the operation and an amount of time for the operation controller to write the command.

2. The measurement system according to claim 1, wherein:
the command storage is provided with a section that stores a plurality of the commands, and
the operation controller writes the plurality of commands to the command storage.

3. The measurement system according to claim 2, wherein the operation executor communicates to the controller details of the operation being performed by the measuring instrument.

4. The measurement system according to claim 3, wherein the operation executor communicates to the controller the details of the operation by writing information to the command storage, the information identifying the details of the operation being performed by the measuring instrument.

5. The measurement system according to claim 4, wherein the operation controller determines the operation to cause the measuring instrument to perform next based on the communicated details of the operation, and writes the command corresponding to that operation to the command storage.

6. The measurement system according to claim 5, wherein, when determining the operation to cause the measuring instrument to perform next, the operation controller erases from the command storage a command for an operation to be performed later than the operation being performed, and writes the command corresponding to the operation to be performed next to the command storage.

7. The measurement system according to claim 1, wherein:
the number of command storages included in the memory is calculated by dividing a maximum command writing time by an average command operation execution time.

8. A measurement system comprising:
a measuring instrument that measures coordinates; and
a controller that generates a command for controlling an operation of the measuring instrument, wherein:
the measuring instrument comprises an operation executor that executes an operation based on a command stored in a command storage that can be browsed by the measuring instrument, and that writes a result of the executed operation to the command storage;
the controller includes an operation controller that writes the command to the command storage, and that writes information contingent on the command and on the result of the operation to the command storage;

when a measured value of a coordinate measurement included in the result of the operation is not within a range predicted based on the command, the operation controller writes error information to the command storage indicating that an error has occurred;

the command storage is provided with a section that stores a plurality of commands;

the operation controller writes the plurality of commands to the command storage;

the operation executor communicates to the controller details of the operation being performed by the measuring instrument;

the operation controller determines the operation to cause the measuring instrument to perform next based on the communicated details of the operation, and writes the command corresponding to that operation to the command storage; and when determining the operation to cause the measuring instrument to perform next, the operation controller erases from the command storage a command for an operation to be performed later than the operation being performed, and writes the command corresponding to the operation to be performed next to the command storage.

9. At least one tangible, non-transitory computer-readable medium storing an executable set of instructions for controlling a coordinate measuring instrument, wherein the set of instructions, when executed by a computer processor, causes the computer processor to execute operations comprising:

generating a command for controlling the coordinate measuring instrument and controlling the measuring instrument based on that command;

writing a command for causing the measuring instrument to perform an operation to a command storage of a number of command storages included in a memory that can be browsed by the measuring instrument; and writing to the command storage information that is contingent on the command and on a result of the operation written to the command storage by the measuring instrument, wherein when a measured value of a coordinate measurement included in the result of the operation is not within a range predicted based on the command, the operation controller writes error information to the command storage indicating that an error has occurred, and the number of command storages is based on an amount of time for the operation executor to execute the operation and an amount of time for the operation controller to write the command.

10. The at least one tangible, non-transitory computer-readable medium according to claim 9, wherein the set of instructions, when executed by the computer processor, causes the computer processor to execute operations further comprising:

calculating the number of command storages included in the memory by dividing a maximum command writing time by an average command operation execution time.

11. A control method wherein a control device that generates a command for controlling a coordinate measuring instrument controls the measuring instrument, the method comprising:

writing a command for causing the measuring instrument to perform an operation to a command storage of a number of command storages included in a memory that can be browsed by the measuring instrument; and writing to the command storage information that is contingent on the command and on a result of the operation that is written to the command storage by the measuring instrument, wherein when a measured value of a coordinate measurement included in the result of the operation is not within a range predicted based on the command, the operation controller writes error information to the command storage indicating that an error has occurred, and the number of command storages is based on an amount of time for the operation executor to execute the operation and an amount of time for the operation controller to write the command.

12. The control method according to claim 11, further comprising:

calculating the number of command storages included in the memory by dividing a maximum command writing time by an average command operation execution time.

* * * * *